United States Patent [19]

Ellingson et al.

[11] Patent Number: 5,296,960
[45] Date of Patent: Mar. 22, 1994

[54] INTRACAVITY-DOUBLED TUNABLE OPTICAL PARAMETRIC OSCILLATOR

[75] Inventors: Randall J. Ellingson; Chung L. Tang, both of Ithaca, N.Y.

[73] Assignee: Cornell Research Foundation, Inc., Ithaca, N.Y.

[21] Appl. No.: 25,377

[22] Filed: Feb. 26, 1993

[51] Int. Cl.$^5$ .......................... G02F 1/39; H01S 3/109
[52] U.S. Cl. .................................. 359/330; 359/328; 372/20; 372/22
[58] Field of Search .................. 372/20–22; 385/122; 359/326–332

[56] References Cited

U.S. PATENT DOCUMENTS

| | | | |
|---|---|---|---|
| 3,609,389 | 9/1971 | Bjorkholm | 359/330 |
| 3,628,182 | 12/1971 | Ashkin et al. | 359/330 X |
| 4,485,473 | 11/1984 | Tang et al. | 372/18 |
| 4,639,923 | 1/1987 | Tang et al. | 372/21 |
| 5,017,806 | 5/1991 | Edelstein et al. | 359/330 |
| 5,033,057 | 7/1991 | Bosenberg et al. | 372/72 |
| 5,034,951 | 7/1991 | Edelstein et al. | 372/22 |
| 5,047,668 | 9/1991 | Bosenberg | 359/330 |
| 5,053,641 | 10/1991 | Cheng et al. | 359/330 |
| 5,134,622 | 7/1992 | Deacon | 372/21 |

OTHER PUBLICATIONS

Y. X. Fan et al., "High Power BaB$_2$O$_4$ Visible Optical Parametric Oscillator Pumped by Single-Axial-Mode 355-nm Pulses", Apr. 25-29, 1988, pp. 527-532.
D. C. Edelstein et al., "Femtosecond ultraviolet pulse generation in $\beta$-BaB$_2$O$_4$", Jun. 27, 1988, pp. 2211–2213, *Applied Physics Letters* 52(26).
W. R. Bosenberg and C. L. Tang, "Type II phase matching in a $\beta$-barium borate optical parametric oscillator", May 7, 1990, pp. 1819–1821, *Appl. Phys. Lett.* 56(19).

*Primary Examiner*—John D. Lee
*Attorney, Agent, or Firm*—Jones, Tullar & Cooper

[57] ABSTRACT

A Ti:sapphire-pumped intracavity-doubled optical parametric oscillator generates up to 240 mW of sub100 femtosecond pulses tunable in the visible. The OPO consists of a 1.5 mm thick KTP crystal configured in a ring cavity which is synchronously pumped by a self-mode-locked Ti:sapphire laser. Intracavity doubling of the OPO is accomplished by inserting a $\beta$-barium borate crystal into an additional focus in the OPO cavity. Continuous tuning of the second harmonic signal from 580 to 657 nm is obtained, with a potential tuning range being approximately 500 to 800 nm.

16 Claims, 3 Drawing Sheets

INTRACAVITY-DOUBLED TUNABLE OPTICAL PARAMETRIC OSCILLATOR

This invention was made with Government support under Grant No. NSF ECS-9108570 awarded by the National Science Foundation and under Contract No. F49620-90-C-0039 by the Air Force Office of Scientific Research (AFOSR). The Government has certain rights in the invention.

BACKGROUND OF THE INVENTION

The present invention relates, in general, to an improved titanium-sapphire (Ti:S) pumped optical parametric oscillator, and more particularly to a high power, high repetition rate, intracavity-doubled optical parametric oscillator capable of producing femtosecond pulses tunable in the visible range.

Since the first demonstration of a high-repetition-rate femtosecond optical parametric oscillator (OPO), which was pumped intracavity by a colliding-pulse mode-locked dye laser there has been considerable interest in the further development of such devices. See, for example, D.C. Edelstein et al, *Applied Physics Letters* 54, page 1728 (1989); E.S. Wachman et al, *Optics Letters* 15, page 136 (1990); and E.S. Wachman et al, *Journal of Applied Physics* 70, page 1893 (1991). As a result of this interest, laser pulses in the femtosecond (fs) time domain have become important tools for studying extremely short duration events such as chemical reactions, for by directing femtosecond pulses at reacting chemicals, for example, researchers can capture spectroscopic information about the structure and behavior of short-lived molecular intermediates of the reactions. Femtosecond lasers, which have pulse widths of from $10^{-15}$ to $10^{-13}$ seconds, are also important for studying the dynamics and ultimate limits of high-speed semiconductor electronic and optical devices.

As pointed out in co-pending application Ser. No. 07/880,656 of Pelouch et al, filed May 11, 1992 and assigned to the assignee of the present application, a lack of suitable laser pump sources initially hampered the development of devices capable of operating with short pulses, high repetition rates and high output power. However, the high peak power at the intracavity focus of a colliding-pulse mode-locked dye laser was exploited to develop the first femtosecond optical parametric oscillator, described in U.S. Pat. No. 5,017,806. This resulted in pulses having widths of about 105 fs, with a pulse repetition rate of about 80 MHz at approximately 3 mW output power. Others resorted to Q-switched and mode-locked lasers to pulse an OPO to produce pulses having a duration of 160 to 260 fs at 4.5 mW average power. The above-mentioned '656 application improved on such devices through the use of an externally pumped, self-mode-locked Ti:S laser for producing high power, high repetition rate femtosecond pulses over a broadly tunable range from about 1.0 $\mu$m to about 2.75 $\mu$m. The Ti:S OPO of that application offers several desirable operating characteristics such as high output power, extensive tunability, nearly transform-limited pulses as short as 57 fs, excellent stability and low amplitude noise. However, there is still a need for an improved tunable source of optical pulses that can operate with a high average output power, short pulse widths, and which is tunable over a range of wavelengths to produce output light which has a shorter wavelength than such prior devices.

SUMMARY OF THE INVENTION

In accordance with the present invention, a Ti:sapphire-pumped, ring-cavity optical parametric oscillator is disclosed which produces an output beam consisting of stable 81 MHz train of pulses having widths in the range of about 100 fs, with the output beam being tunable in at least the visible range of from about 580 nm to 657 nm, and preferably in the range of about 500 nm to 800 nm, with an average total power generated as high as 240 mW. The OPO consists of a first nonlinear crystal such as a 1.5 mm thick KTiPO$_4$ (KTP) crystal, configured in a ring cavity which is synchronously pumped by the self-mode-locked Ti:sapphire laser operating at an 81 MHz repetition rate with an average power of 2.1 W. The pumping laser produces, in one embodiment of the invention, 115 fs pulses at a wavelength of 790 nm which activate the KTP crystal to produce oscillation in the cavity. The ring cavity also incorporates a second nonlinear crystal, such as a beta barium borate ($\beta$-BaB$_2$O$_4$) crystal in an additional focus in the cavity, and this second crystal is pumped by the ring cavity oscillation to produce a second harmonic output signal. In an experimental demonstration of the invention, continuous tuning of the second harmonic output from 580 to 657 nm was demonstrated, with the potential tuning range of this intracavity-doubled KTP oscillator being approximately 500 to 800 nm.

BRIEF DESCRIPTION OF THE DRAWINGS

The foregoing and additional objects, features and advantages of the present invention will be apparent to those of skill in the art from a more detailed consideration of a preferred embodiment thereof, taken in conjunction with the accompanying drawings, in which.

DESCRIPTION OF PREFERRED EMBODIMENT

Figure 1:
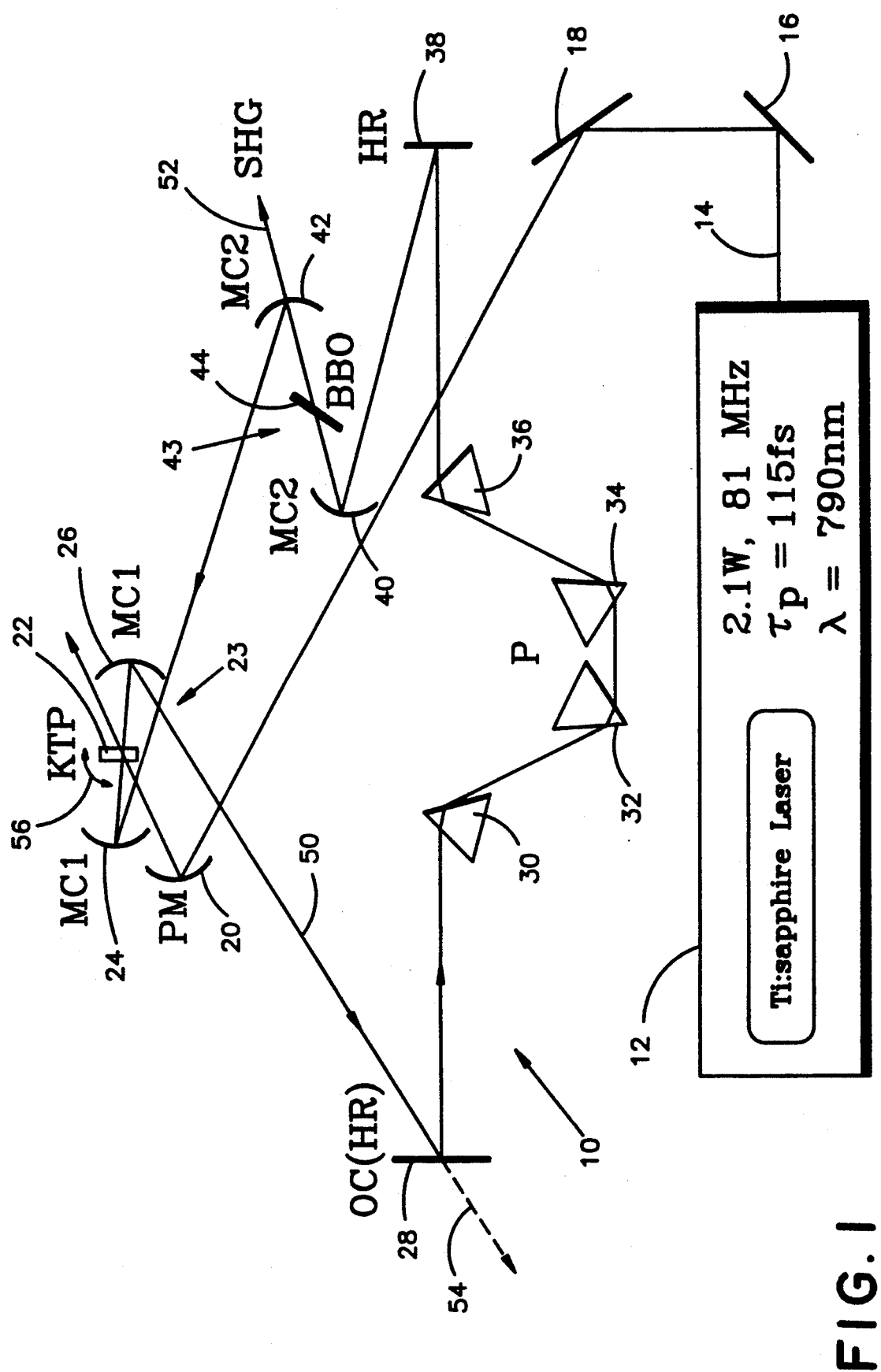
FIG. 1 is a diagrammatic illustration of a Ti:sapphire-pumped intracavity-doubled KTP ring oscillator.

Turning now to a more detailed consideration of the present invention, there is illustrated in FIG. 1 in diagrammatic form a ring oscillator 10 which is pumped by a Ti:sapphire laser 12. The laser is configured in a standard linear cavity using an 18 mm long titanium-doped (0.1%) sapphire crystal, and is pumped by an argon laser (not shown) operating at, for example, 11.5 W, the argon pumping beam being focused on the Ti:sapphire laser, using an f=10 cm lens, through one of the r=10 cm Ti:sapphire cavity mirrors (not shown). Dispersion compensation is achieved in conventional manner, and the laser 12 produces a pump beam 14 having 115 fs pulses at an 81 MHz repetition rate, with an average output power of 2.1 W at a center wavelength of 790 nm.

The laser pump beam 14 is directed, as by mirrors 16 and 18 and pump mirror 20, onto a KTiPO$_4$ crystal 22. This KTP crystal, in one example of an experimental embodiment of the invention, is a 1.5 mm thick crystal which is anti-reflection coated for wavelengths in the neighborhood of, and centered at, 1.3 μm, is cut at $\Theta=45°$ and $\phi=0°$ for type II phase matching in the positive region of the X-Z plane. The pump focusing mirror 20 is an r=25 cm dielectric mirror which is polarized along the Y axis of the KTP crystal 22.

The KTP crystal 22 is located at a first focus 23 in the propagation path of the ring oscillator 10, the focus being defined by curved OPO high reflectors 24 and 26, each of which has a radius r=15 cm.

In addition to the mirrors 24 and 26, the ring laser includes an output coupler mirror 28, fourr sf-14 prisms 30, 32, 34 and 36 spaced 20 cm tip-to-tip, a high reflectance mirror 38, and a second pair of focus mirrors 40 and 42 defining the cavity propagation path. Mirrors 40 and 42 define a second focus 43 in the ring cavity for the doubling crystal 44. As illustrated, the doubling crystal is a 47 μm thick β-barium borate crystal (BBO) which is Brewster-cut for type I phase matching at a wavelength of 850 nm.

The pump beam 14 is directed onto the KTP crystal 22, as described above, to produce an output beam wave 50 which is resonated in the ring cavity 10. The beam 50 is a selected one of the idler and signal waves generated by the BBO crystal, and preferably is the signal wave. The beam travels from mirror 26 to mirror 28, then through the prisms 30, 32, 34 and 36 to mirror 38 which directs the beam into the second focus defined by mirrors 40 and 42. From there, mirror 42 directs the resonating beam back to the KTP crystal. In the experimental embodiment of the invention, mirrors 40 and 42 have a radius equal to 10 cm and all of the mirrors in the ring cavity are coated for a center wavelength of 1.3 μm. The OPO output coupler 28 may provide 1% coupling at 1.3 μm, or in the alternative may be a high reflecting mirror identical to the other cavity mirrors.

The BBO crystal 44 is a frequency doubling crystal which responds to the selected signal (or idler) wave 50 to generate a second harmonic signal 52 which passes out of the ring oscillator through mirror 42, as illustrated in FIG. 1. This second harmonic signal has a wavelength equal to one half of the wavelength of the selected wave 50, and has a pulse width comparable to that of the pump laser pump beam. This wavelength can be, for example, 500–800 nm, with a plse width in the femtosecond range. Orientation of the BBO crystal for phase matching the second harmonic generation at 1.3 μm does not significantly increase the reflective loss suffered by the fundamental OPO signal wave 50. The unidirectional ring cavity of the present invention gives a single output beam 52 for the second harmonic.

Before the device of FIG. 1 can be operated, the cavity must be aligned. Alignment is performed with the additional frequency-doubling focus 43, provided by mirrors 40 and 42, included in the cavity, but without either the BBO crystal 44 or the prism sequence including prisms 30, 32, 34 and 36 inserted. After the oscillator is optimized under these conditions, the prism sequence is inserted, the cavity length is adjusted, and the multipass signal is maximized to regain oscillation. The OPO is again optimized, and the OPO signal beam 50 is used to orient the BBO crystal for phase matching at Brewster's angle. Subsequent insertion of the BBO into the additional focus provided by mirrors 40 and 42 does not destroy the multipass signal through the 1% output coupler 28, and oscillation can easily be regained.

When the ring oscillator 10 includes the 1% output coupler 28 and is pumped by a pumping beam at 2.1 W, it produces a signal beam 50 of approximately 80 mW at 1.3 μm, and 115 mW total second harmonic light in output beam 52. The power of the output second harmonic beam 52 through mirror 42 is reduced by Fresnel reflection off the BBO crystal, is reduced by imperfect transmission through the mirror 42, and is reduced by loss from the collimating lens. If the 1% output coupler 28 is replaced with a high reflector to generate the highest possible second harmonic power, and the intracavity prisms are adjusted to yield the shortest second harmonic pulses, the ring oscillator 10 of the present invention will generate up to 240 mW of second harmonic light at about 115 fs pulse width. A 95 fs pulse width has been obtained by using an extracavity two-prism sequence to compress the output pulse, where the two prisms are spaced 17 cm apart to remove any chirp on the pulses.

Figure 2:
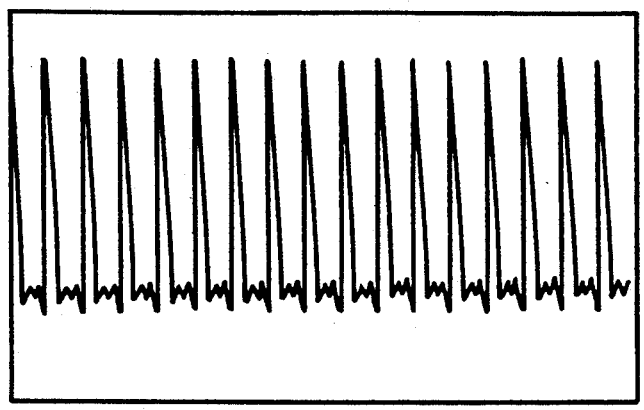
FIG. 2 is a fast-photodiode oscilloscope trace showing the second harmonic output of the oscillator of FIG. 1 on a 20 ns per division time scale.
Figure 3:
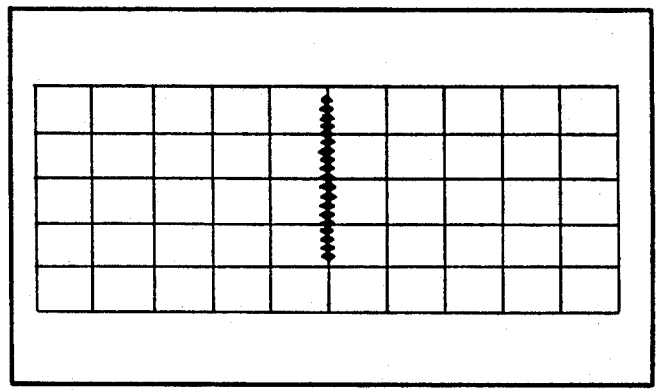
FIG. 3 is a fast-photodiode oscilloscope trace showing the second harmonic output of the oscillator of FIG. 1 on a 2 ns per division time scale.
Figure 4:
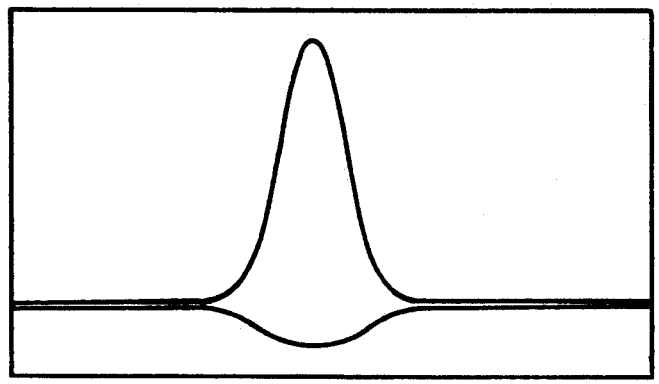
FIG. 4 is a real time autocorrelation oscilloscope trace of the second harmonic output of the oscillator of FIG. 1.

In an experimental embodiment of the invention, it was found that although the OPO cavity was not actively length stabilized, the second harmonic pulse train 52 exhibited excellent stability, as illustrated by the oscilloscope traces in FIGS. 2 and 3. Furthermore, as shown in the real time interferometric autocorrelation of FIG. 4, the pulses obtained by this system are clean and quiet.

When the oscillator 10 is pumped with 115 fs pulses from laser 12, the portion 54 of beam 50 which passes through the output coupler 28 typically has pulse widths in the range of 120 to 170 fs, depending upon the intraprism path length. The pulse width of the second harmonic output 52 is 115 fs, while a pulse width of 95 fs is measured after the two-prism sequence which reduces the time-bandwidth product from 0.45 to 0.37. The time-bandwidth product of the OPO signal fundamental pulses taken through the output coupler is 0.45 (sech$^2$ fit), suggesting that the OPO fundamental pulse may be slightly chirped.

The optical parametric oscillator 10 may be tuned by varying the wavelength of the pump 12. However, in the experimental embodiment, the device is angle-tuned by rotating the phase matching angle of the KTP crystal 22 as indicated by arrow 56. Tuning requires slight adjustment of one flat mirror, adjustment of the KTP crystal, and adjustment of the cavity length, with the OPO continuing to oscillate during these adjustments.

The modified OPO of the present invention, which incorporates the intracavity doubling crystal 44, is simplified when using an ultra-thin BBO crystal. The type I second harmonic generation tuning curve for BBO is multivalued; that is, a given phase matching angle generally matches 2 distinct wavelengths for second harmonic generation. The single-valued point in the second harmonic generation tuning curve, which may be referred to as the "degenerate" point, occurs at a wavelength of 1.47 μm for BBO. At this point, the second harmonic generation group velocity mismatch also goes to zero at the same wavelength. Around this degenerate point, and in the range of about 1.1 to 1.8 μm, the second harmonic generation bandwidth for the 47 μm thick BBO crystal becomes very large as the sinc$^2$ ($\Delta k.l_c/2$) profiles for the two phase matched wavelengths merge and cross. The bandwidth may become as large as about 1700 nm, extending asymmetrically from roughly 1.0 to 2.7 μm at this point.

Figure 5:
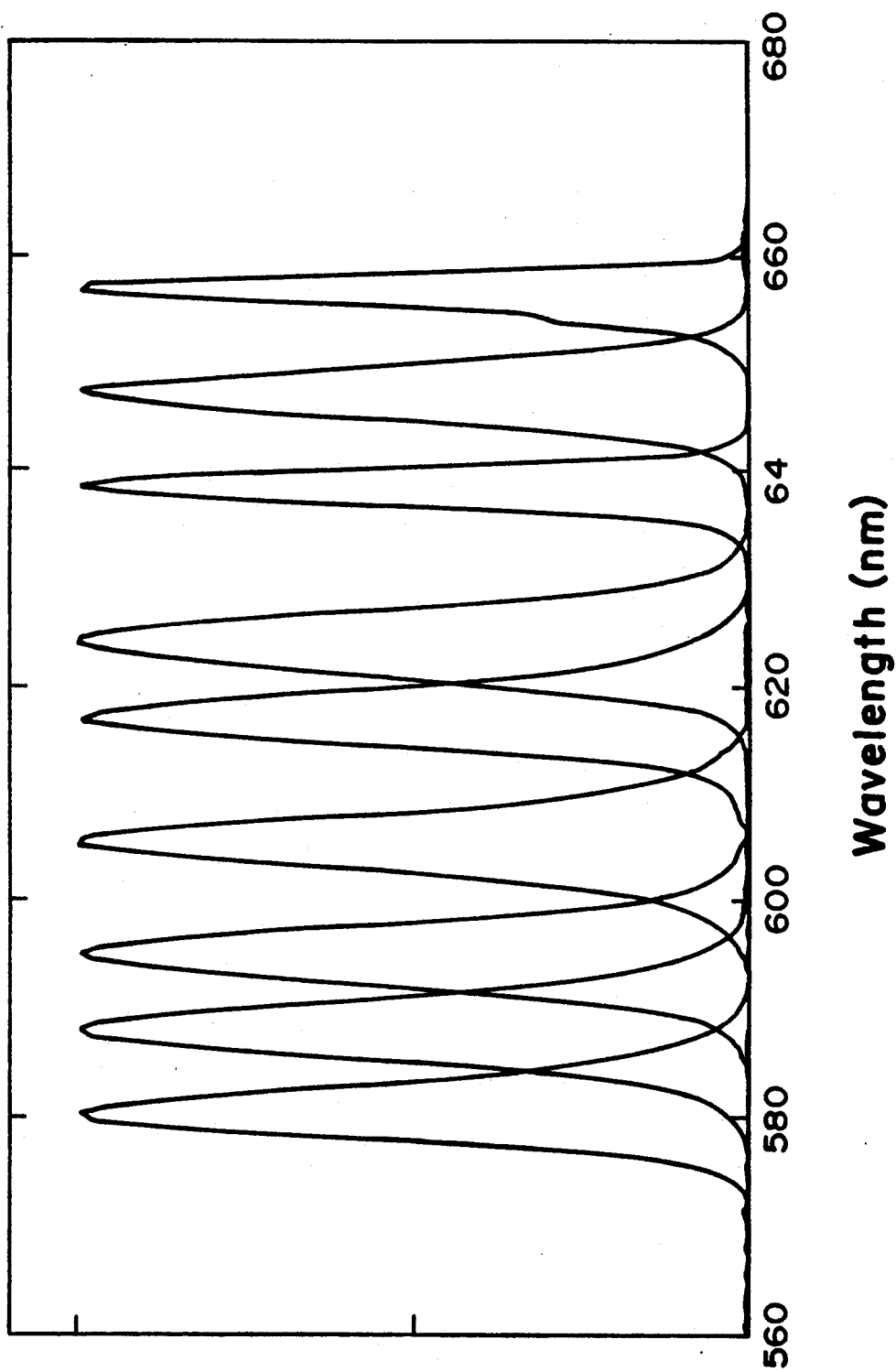
FIG. 5 is a graph illustrating the spectral tuning range of the oscillator of FIG. 1.

In testing of such a device, it was found that after tuning the OPO from 1.3 μm to 1.2 μm, rotating the phase-matching angle had no noticeable effect on the conversion efficiency. Thus, when using a thin BBO crystal, tuning of the OPO does not require adjusting the phase matching angle of the BBO. Representative spectra of the second harmonic output in output beam 52 are illustrated in FIG. 5.

In operation of the intracavity-doubled oscillator 10 using the 1% output coupler, the intracavity circulating power of the fundamental signal was measured at 8 W, yielding a second harmonic generation conversion efficiency of about 1.4%. Based on this measurement, it appears that replacing the output coupler 28 with a high reflector would increase the intracavity circulating power to about 11.5 W and the single harmonic generation conversion efficiency to about 2.1%. Use of a slightly thicker doubling crystal 44 will facilitate the production of good power in the second harmonic signal when lower power from pump 12 is used. The phase matching bandwidth of even a 300 $\mu$m BBO crystal would permit rotation-free phase matching from about 1.2 $\mu$m to about 1.6 $\mu$m, covering the 600 to 800 nm range in the visible and near-infrared.

Although the Brewster-cut BBO crystal 44 minimizes Fresnel loss in the fundamental signal wave 50, the configuration illustrated in FIG. 1 results in a 21% Fresnel loss at the BBO exit surface for the S-plane-polarized second harmonic beam 52. Using a normal-incidence-cut 1.3 $\mu$m antireflection-coated BBO crystal in place of the Brewster-cut crystal 44 would reduce the loss in the second harmonic signal to less than about 6%. The only output coupling inefficiency for the second harmonic beam is the transmission through the optical parametric oscillator high reflector mirror 42. In an experimental ring oscillator, the OPO mirrors transmitted about 80% of the second harmonic signal, and specially-designed single-stack mirrors can increase this transmission to about 90%. The illustrated configuration, with losses of 21% at the BBO exit surface, 20% at the high reflectance oscillator mirror, and 8% at the collimating lens, produces a signal in which about 140 mW of the total 240 mW second harmonic produced by the crystal 44 will be transmitted in beam 52.

It is found that the non-linear loss, which may be about 2% of the total loss, due to single harmonic generation in the intracavity-doubled OPO does not play a major role in shaping the OPO fundamental pulse. Pulse broadening due to linear dispersion of such a thin BBO crystal is insubstantial, so it is expected that shorter pump pulses from laser pump source would yield shorter second harmonic generation pulses.

It has been found that the intracavity doubling of the present invention achieves approximately an order of magnitude greater power in the second harmonic beam than is possible by extracavity doubling of presently available OPO devices. The conversion efficiency is also much greater with an intracavity structure. Furthermore, the transverse mode of the OPO is an exceptionally pure, round $TEM_{00}$, which is achievable regardless of the transverse mode of the Ti:sapphire pump laser 12, and apart from slight irregularities due to BBO surface imperfections, this $TEM_{00}$ mode is imparted to the frequency-doubled beam 52.

Intracavity doubling with a thin BBO crystal does not add significantly to the complexity of the oscillator, nor does it reduce its stability. The linear loss of the additional focus 43 and the doubling crystal 44 is estimated to be less than about 0.5%, and the tuning range of the oscillator is not adversely affected by the presence of the BBO. In addition, the use of a reasonably thin BBO crystal permits hands-off phase matching over the tuning range of the oscillator.

Thus, in accordance with the present invention, a femtosecond pulsed laser, such as an argon-pumped mode-locked Ti:sapphire laser is used to pump an intracavity-doubled OPO to generate tunable pulses having widths of about 100 fs. The signals are tunable over the range of 580 to 657 nm, in one embodiment of the invention, with a potential tuning range of about 500 to 800 nm. The invention provides an important source for high-repetition-rate femtosecond pulses, tunable in the visible range, with high average power, short pulse width, excellent spatial mode quality, high peak power and excellent stability using a shorter wavelength pump beam, and using OPO mirrors which extend down to about 1.05 $\mu$m. Although KTP and BBO crystals are described, other nonlinear crystalline materials can be used in the OPO cavity to provide the frequency-doubling described herein. Further, the sf-10 prisms used in the Ti:sapphire laser 12 can be replaced with low-dispersion prisms and the pulse shaping parameters of both the pump source and within the OPO cavity can be optimized to produce even shorter-pulse operation of the OPO.

Although the invention has been described in terms of a preferred embodiment, it will be apparent to those of skill in the art that modifications may be made without departing from the true spirit and scope thereof as set forth in the following claims.

What is claimed is:

1. A broadly tunable optical parametric oscillator, comprising:
    an oscillator ring cavity having a closed path which includes a first focus, a second focus and beam output means;
    a first nonlinear optical crystal located at said first focus of said cavity;
    a laser pumping source located externally of said cavity and producing a high repetition rate pulsed pump beam;
    means directing said pump beam onto a surface of said first crystal to synchronously pump said first crystal to generate corresponding high repetition rate pulsed idler and signal beams from said first crystal, a selected one of said idler and signal beams being directed along said cavity for oscillation therein;
    a second nonlinear optical crystal located at said second focus of said cavity;
    means in said cavity directing said selected one of said idler and signal beams onto a surface of said second crystal to generate a high repetition rate pulsed second output signal beam which is a second harmonic of said selected one of said idler and signal beams; and
    means directing at least a portion of said second harmonic beam to said beam output means to emit said second harmonic signal from said cavity.

2. The optical parametric oscillator of claim 1, wherein said second harmonic beam has a wavelength equal to one half of the wavelength of the selected idler or signal wave and is pulsed, with a pulse width comparable to that of said pulsed pump beam.

3. The optical parametric oscillator of claim 1, wherein said first focus comprises a first pair of focusing mirrors and said second focus comprises a second pair of focusing mirrors spaced apart along the length of said cavity closed path.

4. The optical parametric oscillator of claim 1, wherein said first nonlinear crystal is a KTP crystal and said second crystal is a BBO crystal.

5. The optical parametric oscillator of claim 1, wherein said laser pumping source is a femtosecond pulsed laser configured in a linear cavity to produce said pump beam.

6. The optical parametric oscillator of claim 1, wherein said beam output means includes a first mirror in said cavity path reflective of said selected one of said signal and idler beams and transmissive of said second harmonic beam to emit said second harmonic signal.

7. The optical parametric oscillator of claim 6, wherein said beam output means includes a second mirror in said cavity path partially transmissive of said selected one of said signal and idler beams.

8. The optical parametric oscillator of claim 6, wherein said first mirror is one of a pair of focusing mirrors forming said second focus in said cavity path.

9. The optical parametric oscillator of claim 8, wherein said first focus comprises another pair of focusing mirrors in said cavity path.

10. The optical parametric oscillator of claim 9, wherein said means directing said pump beam onto a surface of said first crystal comprises a dielectric polarized mirror.

11. The optical parametric oscillator of claim 10, wherein said first crystal is a KTP crystal and said second crystal is a BBO crystal.

12. The optical parametric oscillator of claim 11, wherein said laser pumping source is a Ti:S laser.

13. The optical parametric oscillator of claim 12, wherein said laser pumping source operates at a center wavelength of approximately 790 nm to produce femtosecond-width pulses to pump said KTP crystal.

14. The optical parametric oscillator of claim 12, wherein said KTP crystal is rotatable with respect to said cavity path to produce variable wavelength signal and idler beams in said cavity.

15. The optical parametric oscillator of claim 14, wherein said BBO crystal is phase matched for second harmonic generation of said selected one of said signal and idler beams.

16. The optical parametric oscillator of claim 14, wherein said laser pumping source operates at a center wavelength of about 790 nm, rotation of said KTP crystal producing an emitted second harmonic signal from said BBO crystal having a wavelength selectively tunable between about 500 nm and about 800 nm.

* * * * *